(12) United States Patent
Cogliati et al.

(10) Patent No.: US 10,247,347 B2
(45) Date of Patent: *Apr. 2, 2019

(54) MULTI-LAYERED GAS-FILLED BLADDER FOR ACCOMMODATING CHANGES IN FLUID CHARACTERISTICS WITHIN A FLUID DELIVERY SYSTEM

(71) Applicant: AMTROL Licensing Inc., West Warwick, RI (US)

(72) Inventors: Michael Cogliati, Warwick, RI (US); Christopher A. Van Haaren, Warwick, RI (US)

(73) Assignee: AMTROL LICENSING INC., West Warwick, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/911,508

(22) Filed: Mar. 5, 2018

(65) Prior Publication Data

US 2018/0195656 A1   Jul. 12, 2018

Related U.S. Application Data

(63) Continuation of application No. 15/477,437, filed on Apr. 3, 2017, now Pat. No. 9,933,100, which is a (Continued)

(51) Int. Cl.
*F16L 55/04* (2006.01)
*F16L 55/053* (2006.01)
(Continued)

(52) U.S. Cl.
CPC ............ *F16L 55/053* (2013.01); *B32B 27/08* (2013.01); *E03B 7/075* (2013.01); *B32B 2250/05* (2013.01)

(58) Field of Classification Search
CPC ............................ F16L 55/052; F16L 55/053
(Continued)

(56) References Cited

U.S. PATENT DOCUMENTS 2,360,590 A   10/1944   Schweller
2,387,598 A   10/1945   Jean Mercier
(Continued)

FOREIGN PATENT DOCUMENTS

DE   845582   8/1952
DE   3632988   6/1988
(Continued)

OTHER PUBLICATIONS

Extended European Search Report dated Dec. 18, 2017 Issued During the Prosecution European Patent Application No. EP 15795612.9 (9 Pages).
(Continued)

*Primary Examiner* — Patrick F Brinson
(74) *Attorney, Agent, or Firm* — Tucker Ellis LLP; Carlos Garritano

(57) ABSTRACT

An absorber for use in a fluid delivery system is disclosed which includes a housing defining an interior chamber, a connective fitting extending from the housing in fluid communication with the interior chamber for connecting the housing to the fluid delivery system, and at least one gas-filled bladder or cell disposed within the interior chamber of the housing to accommodate changes in fluid characteristics, such as, for example, pressure and volume, within the fluid delivery system, the gas-filled bladder or cell having a predetermined pre-charge pressure and a multi-layered flexible polymeric shell including a plurality of successive relatively thin polymeric shell layers to inhibit the formation of leak paths through the shell in the event that a single shell layer fails.

24 Claims, 5 Drawing Sheets

Related U.S. Application Data continuation of application No. 14/806,205, filed on Jul. 22, 2015, now Pat. No. 9,702,495, which is a continuation-in-part of application No. 14/282,539, filed on May 20, 2014, now Pat. No. 9,366,373.

(51) Int. Cl.
*B32B 27/08* (2006.01)
*E03B 7/07* (2006.01)

(58) Field of Classification Search
USPC .................................................. 138/26, 30
See application file for complete search history.

(56) References Cited

U.S. PATENT DOCUMENTS

| | | | |
|---|---|---|---|
| 2,474,512 | A | 6/1949 | Bechtold et al. |
| 2,638,932 | A | 5/1953 | Alexander |
| 2,808,070 | A | 10/1957 | Malsbary |
| 3,061,039 | A | 10/1962 | Peters |
| 3,213,913 | A | 10/1965 | Petriello |
| 3,550,634 | A | 12/1970 | Kupiec |
| 3,621,882 | A | 11/1971 | Kupiec |
| 4,020,872 | A | 5/1977 | Sugimura |
| 4,209,041 | A | 6/1980 | Loukonen |
| 4,651,781 | A | 3/1987 | Kandelman |
| 4,714,093 | A | 12/1987 | Kawano |
| 4,823,844 | A | 4/1989 | Bartholomew |
| 4,911,204 | A | 3/1990 | Martin |
| 5,004,647 | A | 4/1991 | Shah |
| 5,117,873 | A | 6/1992 | Miyakawa |
| 5,215,124 | A | 6/1993 | Hattori |
| 5,409,041 | A | 4/1995 | Yoshida |
| 5,524,671 | A | 6/1996 | Yoshida |
| 5,618,629 | A | 4/1997 | Takamatsu |
| 5,645,922 | A | 7/1997 | Le Rossignol |
| 5,709,248 | A | 1/1998 | Goloff |
| 5,992,832 | A | 11/1999 | Lamorlette |
| 6,016,841 | A | 1/2000 | Larsen |
| 6,620,472 | B1 | 9/2003 | Shepard |
| 6,672,337 | B2 | 1/2004 | Kobayashi |
| 7,562,678 | B1 | 7/2009 | Kulikov |
| 2002/0059959 | A1 | 5/2002 | Qatu et al. |

FOREIGN PATENT DOCUMENTS

| | | |
|---|---|---|
| JP | 02286997 | 11/1990 |
| JP | 2012092868 | 5/2012 |

OTHER PUBLICATIONS

PCT International Search Report Dated Aug. 26, 2015 Issued on Corresponding PCT International Application No. PCT/US2015/031733.
Written Opinion of the International Searching Authority dated Aug. 26, 2015 Issued on Corresponding PCT International Application No. PCT/US2015/031733.
International Search Report dated Nov. 2, 2016 in Connection With Inernational Appl. No. PCT/US2016/043316.
Written Opinion dated Nov. 2, 2016 in Connection With International Application No. PCT/US2016/043316.

MULTI-LAYERED GAS-FILLED BLADDER FOR ACCOMMODATING CHANGES IN FLUID CHARACTERISTICS WITHIN A FLUID DELIVERY SYSTEM

CROSS-REFERENCE TO RELATED APPLICATIONS

This application is a continuation of U.S. application Ser. No. 15/477,437, filed on Apr. 3, 2017. Application Ser. No. 15,477,437 is a continuation of U.S. application Ser. No. 14/806,205, filed on Jul. 22, 2015, which is a continuation-in-part of U.S. application Ser. No. 14/282,539, which was filed on May 20, 2014. The disclosures of the aforementioned applications are herein incorporated by reference in their entireties.

BACKGROUND OF THE INVENTION

1. Field of the Invention

The subject invention relates to an absorber for a fluid delivery system, and more particularly, to a multi-layered gas-filled bladder for accommodating changes in the fluid characteristics that exist within a fluid delivery system, including, for example, absorbing volume expansion due to water heating within the fluid delivery system, suppressing or arresting pressure surges associated with a shock wave or water hammer propagating through the water delivery system, or accommodating volume expansion within a reverse osmosis water filtration system to provide a storage volume of fluid.

2. Description of the Related Art

Incompressible fluids (such as water) produce volumetric affects under certain conditions. For instance, when heated, water expands in volume. Within a fixed contained system, this heated expansion of water will increase the pressure within the system. Another volume affect is that shock waves occur in fluid systems when a flow in the supply is quickly and abruptly closed or when a force in flow is suddenly changed. The fluid system is usually a liquid system, but sometimes also is a gas system. Such shock waves commonly occur when a valve is closed at an end of a piping system, resulting in a pressure wave propagating in the pipe, which is commonly referred to as a water hammer.

The change in pressure within a fluid delivery system, by thermal expansion or by closure of the supply or sudden change in momentum of the flow can cause substantial problems. For example, a buildup of water flow can be created, resulting in a pressure spike that can physically rattle the pipes, causing noise and vibration. This noise and vibration can often be heard and felt within a dwelling or building. The water hammer also produces stress on the pipes and components in the piping system, which can lead to failure in the system and water damage.

While the presence of the water hammer phenomena cannot always be anticipated when planning plumbing layouts, it can be corrected. In particular, in order to prevent violent pipe noise, system failure and damage, devices have been developed to provide an alternate path for dissipating or otherwise absorbing high pressure spikes in a fluid delivery system.

For example, shock suppressors have been developed to reduce the pressure spike in a fluid delivery system. Such shock suppressors, also referred to as water hammer arrestors, utilize a pre-charge of air to provide an air cell or air cushion that absorbs the pressure shock in the system. One example of such a device includes an air chamber in the form of a vertical pipe located in a wall of piping at a point located near a faucet or valve.

The air chamber acts as a cushion to prevent impact between the water and the piping. As the pressure shock enters the shock suppressor, the air cushion compresses, the air pressure increases and the shock is absorbed. These shock suppressors can be incorporated into a system component such as a valve or the like, and generally include a movable piston that is sealed to the inner diameter of the pipe. The air charge on one side of the piston provides resistance to water pressure on the other side of the piston until the water pressure increases above the air charge pressure. When this occurs, the expanded water pushes the piston and enters the pipe.

Shock absorbers have also been developed which include a flexible diaphragm separating the air cushion from the water stream that enters the shock absorber. It can be positioned at an appropriate location within a piping system so that when water flow is abruptly stopped or changed within the system, the water can enter the shock absorber. As the water enters the shock absorber, it comes into contact with the diaphragm which is pushed towards the air cushion on a side opposite the water side, compressing the air cushion. The contact with the diaphragm and compression of the air cushion acts to absorb the pressure shock.

While such shock suppressors are capable of reducing water hammer and addressing the problems resulting therefrom, they are susceptible to losing their ability to absorb pressure shock and volume expansion over time. In particular, the diaphragm often weakens and fails, for example, at an outer edge or at an inside portion along the diaphragm. This failure reduces and often eliminates the ability of the shock suppressor to absorb water and pressure shock.

Furthermore, if the diaphragm fails and allows water to pass into the air cushion side, the water will come into contact with what is generally an unprotected metal housing, leading to corrosion and rust in the system. Consequently, regular maintenance of this type of shock absorber is required, often resulting in the need to replace the entire system. In addition, in this type of shock suppressors, a pre-charge of air is required to provide the air cushion. This complicates the design and application and maintenance of the shock absorber.

The present invention also provides an improved volume expansion absorber that absorbs a volume of water from a system. For example, when water in a system is heated, it expands, which results in an increased volume of water in the system that must be accommodated. The absorber readily accommodates this increased volume of water. The present invention also provides an absorber that accommodates volumetric expansion within a reverse osmosis water filtration system to provide a storage volume of fluid for subsequent delivery to a faucet or tap for consumption.

SUMMARY OF THE INVENTION

The subject invention is directed to a new and useful absorber for use in a fluid delivery system. The absorber includes a housing defining an interior chamber, a connector extending from the housing in fluid communication with the interior chamber for connecting the housing to the fluid delivery system, and at least one gas-filled bladder disposed within the interior chamber of the housing to accommodate changes in fluid characteristics within the fluid delivery system. The at least one gas-filled bladder has a multi-layered flexible polymeric shell that includes a plurality of successive relatively thin polymeric shell layers to inhibit the formation of leak paths through the shell in the event that a single shell layer fails.

In an embodiment of the invention, the housing is connected to the fluid delivery system in such a manner so that the gas-filled bladder accommodates changes in fluid pressure within the fluid delivery system. In another embodiment of the invention the housing is connected to the fluid delivery system in such a manner so that the at least one gas-filled bladder accommodates changes in fluid volume within the fluid delivery system. In yet another embodiment of the invention, the housing is connected to the fluid delivery system in such a manner so that the gas-filled bladder accommodates changes in fluid volume within a reverse osmosis filtration system to provide a storage volume of fluid.

In an preferred embodiment of the subject invention, the absorber is configured as a shock suppressor or water hammer arrestor, and it includes a housing defining an interior chamber, a connective fitting extending radially outwardly from the housing in fluid communication with the interior chamber, and at least one air-filled bladder disposed within the interior chamber of the housing.

The air-filled bladder or cell has a predetermined pre-charge of air pressure of about between 20 to 30 psi to absorb a pressure wave propagating in the fluid delivery system and/or to accommodate volumetric expansion within the fluid delivery system caused by heating or well pump activity. Due to the pre-charged air bladder, the absorber of the subject invention is essentially maintenance free.

In accordance with a preferred embodiment of the subject invention, the bladder or air cell has a multi-layered polymeric shell that includes a plurality of successive relatively thin polymeric shell layers to inhibit the formation of leak paths through the shell in the event that a single shell layer fails. Preferably, the housing and the bladder both have a generally spherical configuration, although the housing and bladder can have other geometric configurations, such as, for example, ovoid configurations. Furthermore, the housing preferably includes two hemi-spherical sections that are assembled by spin welding. The outer diameter of the bladder is preferably slightly smaller than the inner diameter of the housing so that the bladder is free to move around within the interior chamber of the housing.

Preferably, adjacent polymeric shell layers of the bladder are formed from dissimilar polymeric materials. It is envisioned that multi-layered polymeric shell can include successive polymeric layers formed from the group consisting of ethylene vinyl alcohol (EVOH), polyester, polyether, polyurethane, polyether urethane, polyester urethane, ethylenevinylacetate/polyethylene copolymer, polyester elastomer (Hytrel), ethylenevinylacetate/polypropylene copolymer; polyethylene, polypropylene, neoprene, natural rubber, dacron/polyester, polyvinylchloride, thermoplastic rubbers, nitrile rubber, butyl rubber, sulfide rubber, polyvinyl acetate, methyl rubber, buna N, buna S, polystyrene ethylene propylene, polybutadiene, polypropylene and silicone rubber.

It is also envisioned that the multi-layered polymeric shell could include as many as seventy-two successive polymeric layers. However, the outer most polymeric layer in the multi-layered polymeric shell is preferably formed from a material other than ethylene vinyl alcohol EVOH due to its hygroscopic properties. The bladder preferably has an overall shell thickness of about approximately 0.035" after it has been formed from a multi-layered sheet of polymeric material. In this regard, the multi-layered material from which the shell is formed preferably has an initial thickness of about between 0.065" and 0.075" thick sheet.

It is envisioned that the absorber of the subject invention could include plural air bladders or cells, wherein each of the air bladders have similar constructions or wherein one or more of the air bladders have differing constructions. The plural gas-filled bladders provide redundancy for continuing operation in the event that one or more of the plural bladders fails.

These and other features of the device, system and methods of the subject invention will become more readily apparent to those having ordinary skill in the art from the following enabling description of the preferred embodiments of the subject invention taken in conjunction with the several drawings described below.

BRIEF DESCRIPTION OF THE DRAWINGS

So that those skilled in the art to which the subject invention appertains will readily understand how to make and use the absorber of the subject invention without undue experimentation, preferred embodiments thereof will be described in detail herein below with reference to certain figures, wherein.

DETAILED DESCRIPTION OF THE PREFERRED EMBODIMENTS

Figure 1:
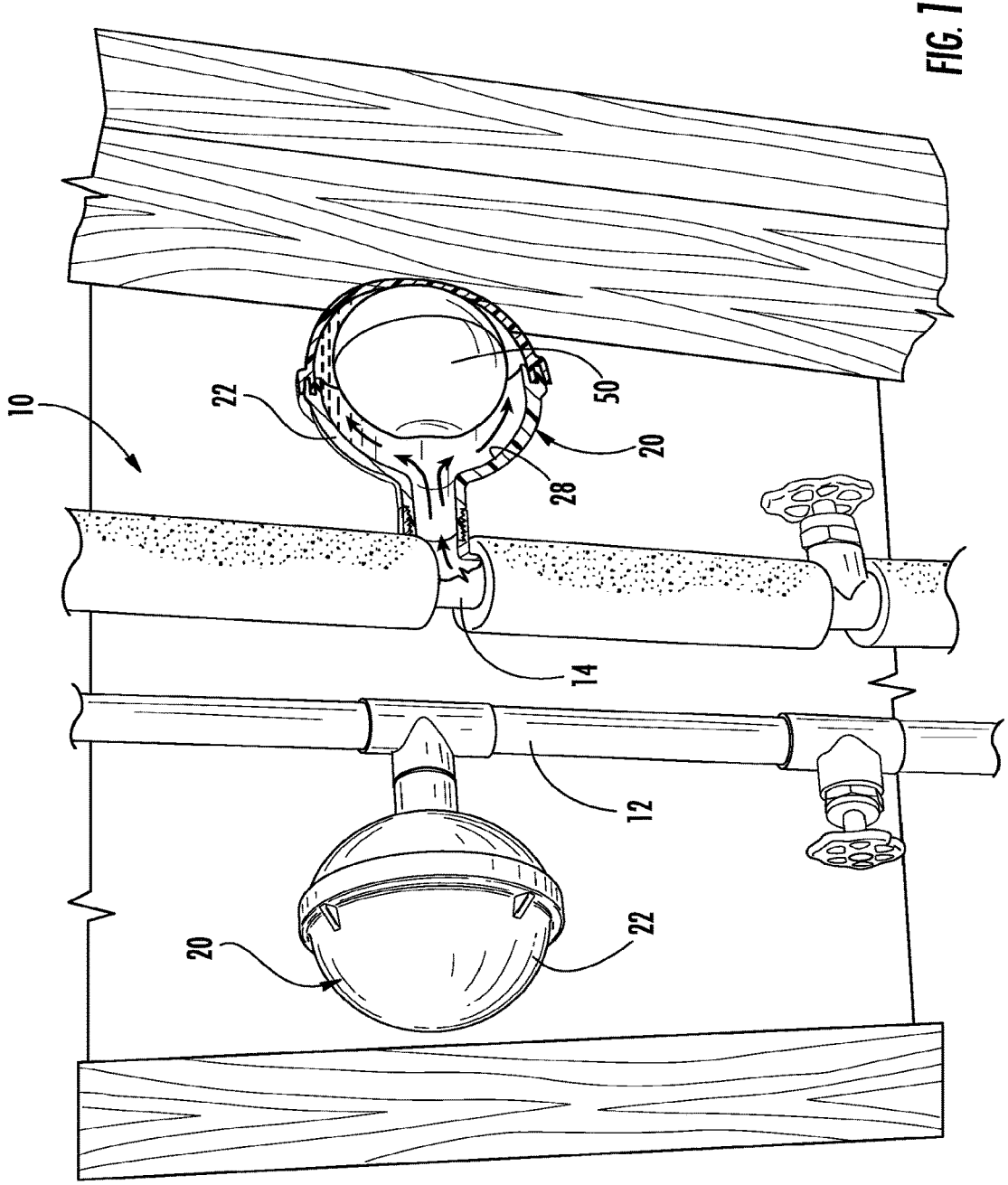
FIG. 1 is an illustration of a fluid delivery system in which absorbers constructed in accordance with a preferred embodiment of the subject invention are installed to accommodate changes in the fluid characteristics within the system, including pressure surges and volumetric expansion.

Referring now to the drawings wherein like reference numeral identify similar structure elements or features of the subject invention, there is illustrated in FIG. 1 a fluid delivery system 10 consisting of a network of pipes located within a residential home for delivering hot and cold water throughout the home. As illustrated, a pressure/volume absorber 20 constructed in accordance with a preferred embodiment of the subject invention is associated with both a cold water delivery pipe 12 and a hot water delivery pipe 14 to accommodate changes in fluid characteristic with the fluid delivery system 10.

In use, the pressure/volume absorbers 20 accommodate pressure changes and volume expansion within the pipes 12, 14 of the fluid delivery system 10. For example, the absorber 20 can accommodate pressure changes under a variety of circumstances, in order to reduce or otherwise prevent vibration in the pipes that can generate noise and potentially damage the system over time, leading to failure and water damage to the dwelling. Pressure changes can arise when water faucets or valves connected to the fluid delivery system are closed, causing a rapid pressure build-up in the pipes of the system. The absorber 20 can also accommodate volumetric expansion which can occur when water in the fluid delivery system 10 is heated or when water pressure is increased from well pump activity.

Figure 2:
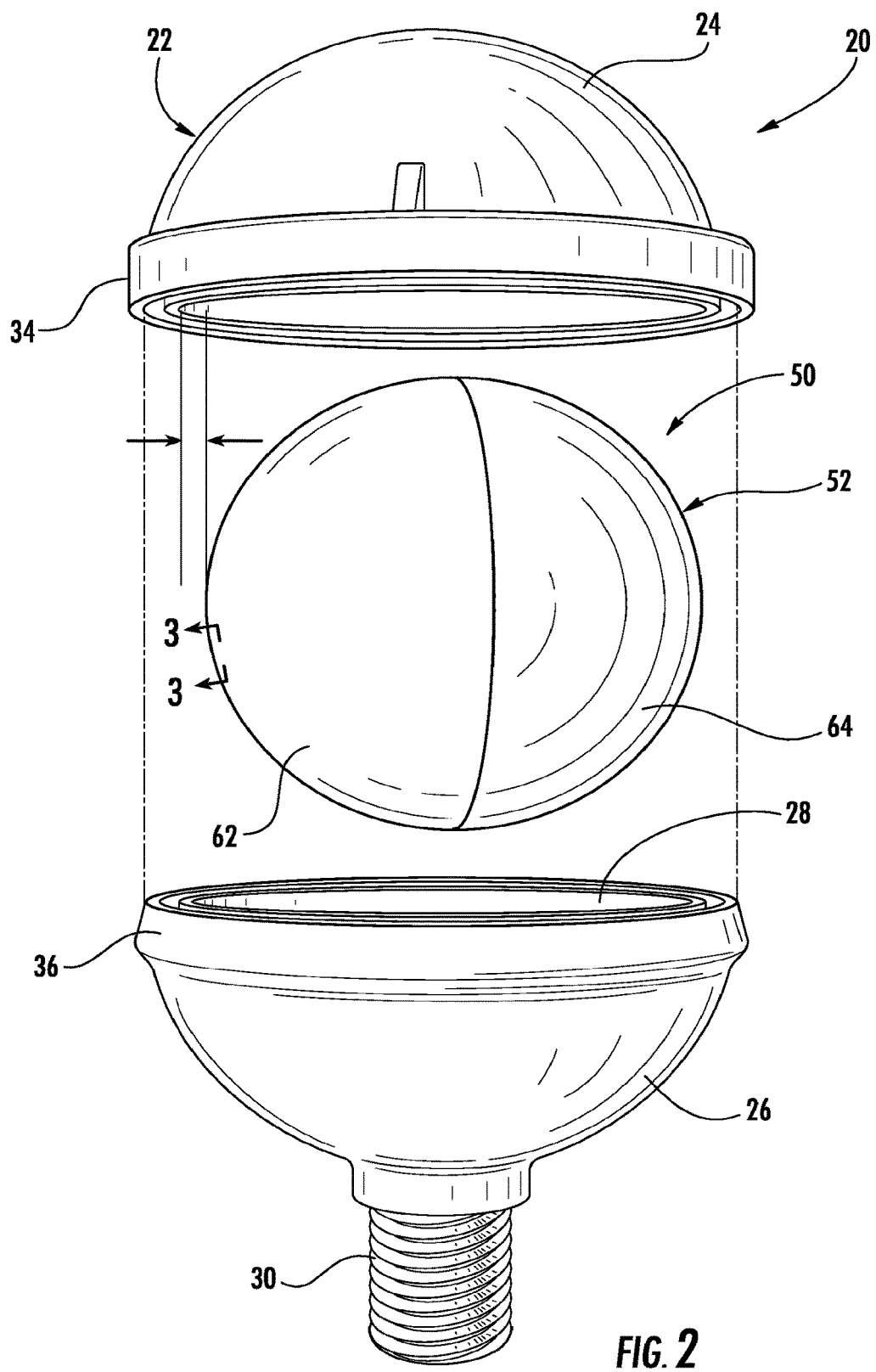
FIG. 2 is an exploded perspective view of the absorber of the subject invention, with parts separated for ease of illustration.

Referring now to FIGS. 1 and 2, the absorber 20 includes a generally spherical housing 22 formed from two generally semi-spherical and substantially rigid upper and lower housing portions 24 and 26. The upper and lower housing portions 24 and 26 have respective circumferential flanges 34 and 36. As illustrated, the circumferential flange 34 of the upper housing portion 24 is dimensioned and configured to slightly overlap the circumferential flange 36 of the lower housing portion 26, which aids in the ultimate fabrication of the housing 22. Those skilled in the art will appreciate that this can be reversed so that the upper flange is overlapped by the lower flange.

During fabrication, the upper and lower housing portions 24 and 26 of housing 22 are joined to one another along the respective upper and lower flanges 34 and 36 by a spin welding process or by a similar joining process know in the art. By way of non-limiting example, the assembled housing 22 has a height of about 4½ inches and an outer diameter of about 3½ inches. Those skilled in the art will readily appreciate that the overall dimensions of the housing will vary depending upon the system requirements or applications.

The housing 22 defines an interior chamber 28 having an inner diameter (I.D.). A connective fitting or threaded stem connection 30 extends radially outwardly from the lower semi-spherical housing portion 26. The connective fitting 30 is in fluid communication with the interior chamber 28 and is configured to connect the housing 22 to the fluid delivery system 10, as shown for example in FIG. 1. By way of non-limiting example, the connective fitting has a ½ inch NPT connection size. Those skilled in the art will readily appreciate that the connective fitting 30 can be configured with internal threading as opposed to the external threaded that is shown in the figures. Furthermore, the connective fitting can be configured and adapted to connect with standard or specialized plumbing components depending upon system design requirements.

With continuing reference to FIG. 2, the pressure absorber 20 of the subject invention further includes a generally spherical, gas-filed, preferably air-filled bladder or cell 50, which is disposed within the interior chamber 28 of the housing 22 to accommodate volumetric expansion and/or absorb a pressure wave propagating in the fluid delivery system 10.

Depending upon size, the bladder 50 will have a predetermined precharge of air pressure (or a similar inert gaseous substance such as nitrogen) of about between 20 to 30 psi. Moreover, a precharge of air pressure in the range of 20 psi may be used for a smaller sized bladder, while a precharge pressure closer to the range of 30 psi would be used for a larger sized bladder. This differential is not a matter of system pressure, but rather it is a matter of the pressure that causes a shock in a certain sized pipe or conduit in the fluid delivery system 10. It should be readily appreciated by those having ordinary skill in the art that the bladder or cell 50 has no means for adjusting the pre-charged pressure. Thus, the absorber 20 is essentially maintenance free. This in is contrast to prior art pressure absorbers that are pressurized when installed through an air stem which defines a potential leak path.

Figure 3:
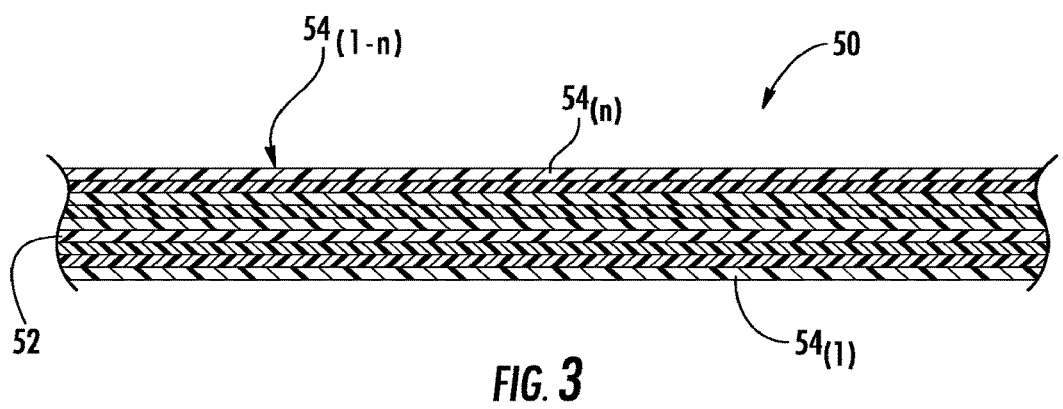
FIG. 3 is a cross-section view of the wall of the multi-layered polymeric shell of the air bladder or cell that forms part of the absorber of the subject invention.

As best seen in FIG. 3, the bladder 50 has a multi-layered flexible polymeric shell 52 including a plurality of successive relatively thin polymeric shell layers $54_{(1-n)}$ to inhibit the formation of leak paths through the shell 52 in the event that a single shell layer 54 fails. Adjacent shell layers $54_{(1-n)}$ are formed from dissimilar materials so that it will be difficult for a leak path to propagate through the shell 52 from one layer to the next adjacent layer. The multi-layered polymeric shell 52 includes as many as seventy-two successive polymeric layers, thus layer $54_{(1-72)}$.

The polymeric layers $54_{(1-n)}$ forming the shell 52 are selected from a group of polymeric materials that include ethylene vinyl alcohol (EVOH), polyester, polyether, polyurethane, polyether urethane, polyester urethane, ethylenevinylacetate/polyethylene copolymer, polyester elastomer (Hytrel), ethylenevinylacetate/polypropylene copolymer; polyethylene, polypropylene, neoprene, natural rubber, dacron/polyester, polyvinylchloride, thermoplastic rubbers, nitrile rubber, butyl rubber, sulfide rubber, polyvinyl acetate, methyl rubber, buna N, buna S, polystyrene ethylene propylene, polybutadiene, polypropylene and silicone rubber.

Because the outer-most layer $54_{(1)}$ of the shell 52 of bladder 50 is in contact with water, it is preferably formed from a material other than ethylene vinyl alcohol EVOH due to the hygroscopic properties of that material. Moreover, EVOH provides good permeation resistance, whereas polyester provides strength and abrasion resistance and polyether reduces water absorption for longevity. Polyurethane provides flexibility and abrasion resistance.

By way of non-limiting example, a combination of selected materials may result in a bladder with performance in air temperatures from −40 F to 140 F, water temperature from 30 F to 180 F and a minimum burst pressure of 900 psig.

The bladder or cell 50 is constructed from to substantially identical hemi-spherical sections 62 and 64 that are joined to one another along an equatorial seam in a spin welding process or by a similar joining technique known in the art. Accordingly, the material selection must be such that the bladder 50 has relatively good heat stake weldability on the seam to maintain shape and strength.

In a preferred embodiment of the subject invention, the bladder or cell 50 has an overall shell thickness of about approximately 0.035" after forming and joining the two hemi-spherical shell portions. The multi-layered sheet of material from which the shell 52 is formed has an initial thickness of about between 0.065 and 0.075 inches. In general, when it is formed, the spherical bladder 50 has an outer diameter (O.D.) that is slightly less than an inner diameter (I.D.) of the interior of the housing 22.

The bladder or cell 50 is configured so that it flexes to absorb volume expansion and/or pressure, as shown for example in the hot water side of FIG. 1. The multi-layered material from which the bladder 50 is constructed provides resistance because the interior of the bladder 50 maintains a reference pressure to the shock pressure on the exterior. Therefore, the increase in external pressure by the shock, forces the multi-layered material to flex inward into the reference pressure of the hollows sphere, thereby absorbing the system shock pressure.

Figure 5A:
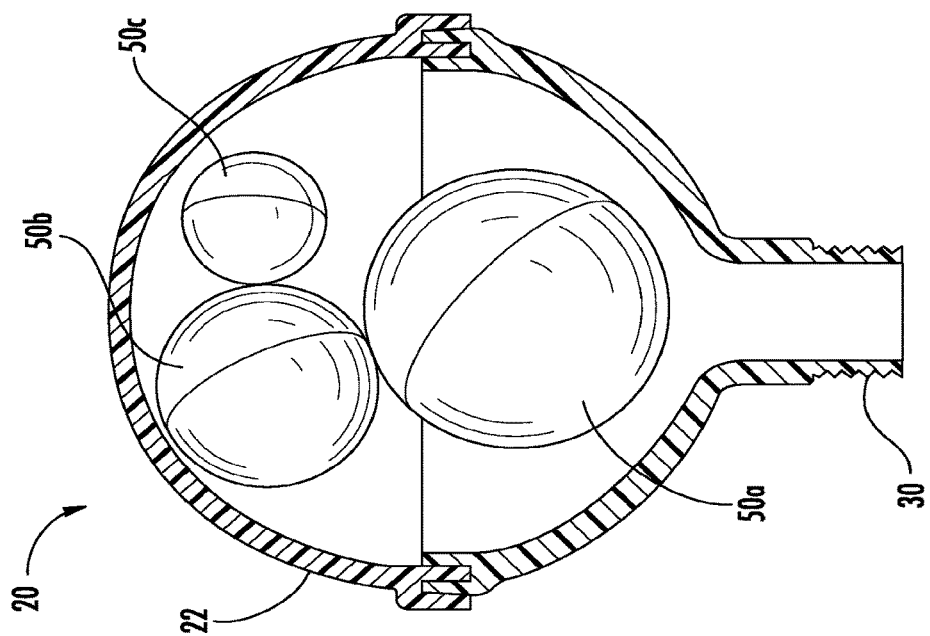
FIG. 5a is a cross-sectional view of the absorber of the subject invention which includes plural bladders having a similar construction.
Figure 5B:
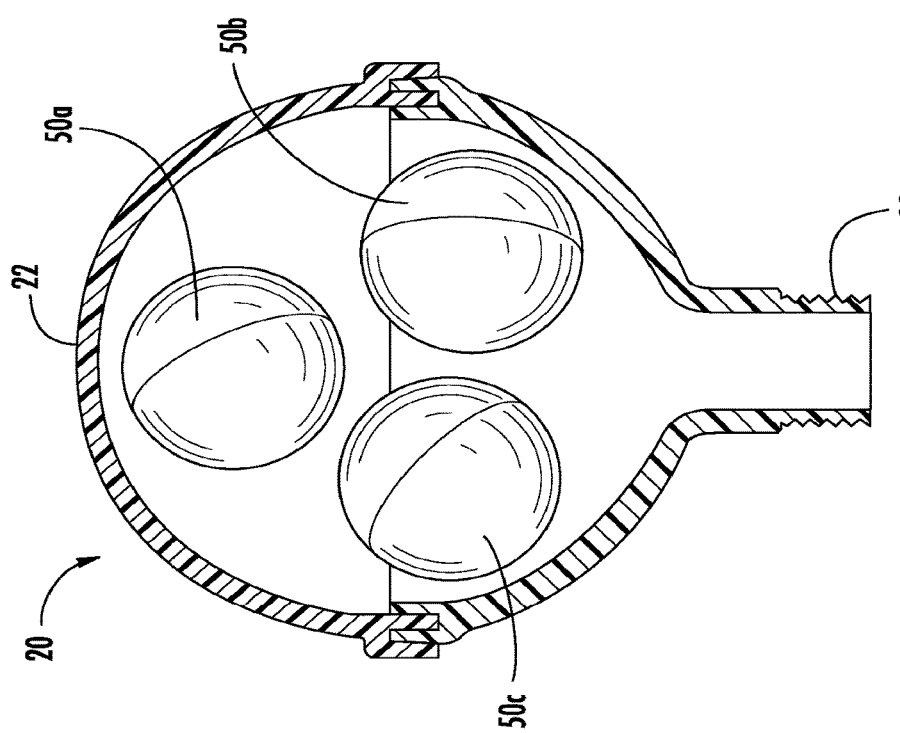
FIG. 5b is a cross-sectional view of the absorber of the subject invention which includes plural bladders having differing constructions.

It is envisioned that a plurality of bladders or cells 50 can be disposed within the housing 22 of the absorber 20. In some embodiments, these plural bladders can have the same shape and size, and be constructed from the same materials, so as to have similar pressure/water absorption capabilities, as shown in FIG. 5a where bladders 50a-50c have a similar construction. In other embodiments, the plural bladders can be provided with differing shapes, sizes, materials, and/or pressure/water absorption capabilities, as shown in FIG. 5b where bladders 50a-50c have differing constructions. Such embodiments are beneficial if larger water volume expansions are anticipated, because the plural bladders can compress towards each other, resulting in a first absorption capacity, and each individual bladder can further absorb an amount of pressure and/or water volume resulting in a second absorption capacity.

Furthermore, in the event that one of the bladders fails, the device can continue to function to a degree because the remainder of the bladders can still function to absorb pressure and/or water volume. The plurality of bladders prevents a catastrophic "dead" tank because the redundancy allows continuing function, although reduced, to maintain operation in the system. This provides the benefit of improved product reliability. When an air cell or bladder fails with a tank of only bladder, the product ceases to function. With multiple air cells or bladders, when one cell fails, the product continues to function to a degree to extend the life of the product. With proper maintenance, the degraded function can signal a replacement of the product before a serious failure of any components of the system.

The bladder or cell 50 is configured such that the resistance matches and absorbs the water pressure that comes into contact therewith. The bladder 50 is further formed to have a wall thickness that, together with the material used in forming the bladder, provides the properties that are needed to provide control and absorption of pressure shocks and or water volume expansion as needed.

The bladder 50 is configured to deform as it absorbs pressure and/or a volume of water and then return to its original shape when it is not under pressure and/or is not absorbing the increased volume of water. The bladder 50 can also be configured such that it does not return to its original shape when it is not exposed to pressure and/or an increased volume of water. In either case, the bladder 50 is fabricated such that it is provided with a resistance, in its original shape or in its deformed shape that allows it to absorb subsequent pressure fluctuations and/or water volume fluctuations in the system repeatedly.

The bladder 50 can be fabricated so as to have more or less flexibility depending on its desired use. For example, a bladder 50 having greater flexibility will enable a greater amount of water volume absorption capability, because it will be more capable of flexure. On the other hand, a bladder 50 having a greater rigidity will provide a lesser amount of water volume absorption capability, because it will be less capable of flexure. The number of layers included in the shell of the balder and/or the materials that are used and the relative arrangement thereof can be selected to achieve a desired flexibility.

Figure 4:
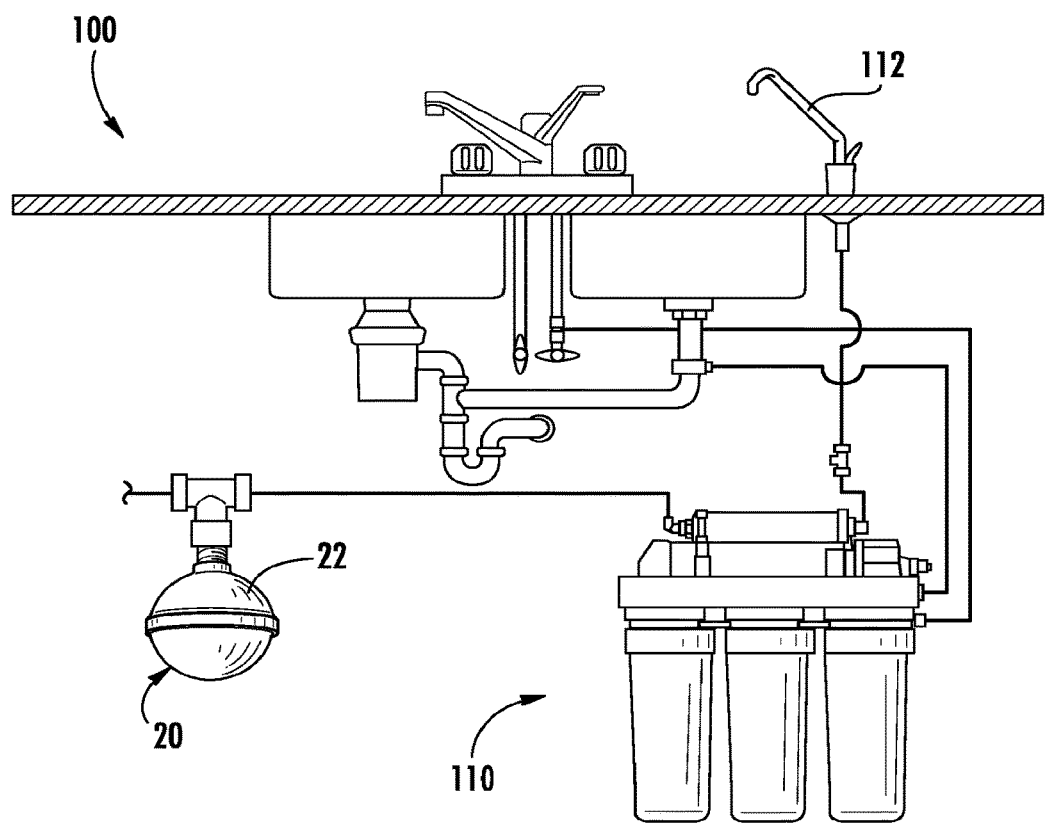
FIG. 4 is an illustration of a fluid delivery system that includes a reverse osmosis water filtration sub-system having an absorber constructed in accordance with the subject invention positioned to absorb fluid volume expansion to provide a storage volume of water.

Referring now to FIG. 4, there is illustrated a fluid delivery system 100 located within a residential kitchen. The fluid delivery system 100 includes a reverse osmosis water filtration sub-system 110 that communicates with a counter-top tap 112 and an absorber 20 constructed in accordance with the subject invention. In water delivery system 100, the housing 22 of absorber 20 is connected in such a manner so that the air-filled bladder 50 located therein accommodates changes in fluid volume within the reverse osmosis sub-system 110 to provide a storage volume of water for ready delivery to the tap 112 upon demand. In such a configuration, the housing 22 of absorber 20 has an outer diameter of about 8 inches or more in order to provide a storage volume of filtered water of at least 1 gallon or more. In this configuration, the air-filled bladder 50 has a pre-charge of about between 5 to 40 psi depending upon the application and/or system requirements.

While the subject invention has been shown and described with reference to a number of preferred embodiments, those skilled in the art will readily appreciate that various changes and/or modifications may be made thereto without departing from the spirit and scope of the subject invention as defined by the appended claims.

What is claimed is:

1. An absorber for use in a fluid delivery system, comprising:
   a) a housing defining an interior chamber;
   b) a connector extending from the housing in fluid communication with the interior chamber for connecting the housing to the fluid delivery system, wherein fluid from the fluid delivery system flows into and out of the housing via the connector; and
   c) at least one gas-filled bladder disposed within the interior chamber of the housing to accommodate changes in fluid characteristics within the fluid delivery system, the at least one gas-filled bladder having a multi-layered flexible polymeric shell enclosing the at least one gas-filled bladder.

2. An absorber as recited in claim 1, wherein the housing is connected to the fluid delivery system in such a manner so that the at least one gas-filled bladder accommodates changes in fluid pressure within the fluid delivery system.

3. An absorber as recited in claim 1, wherein the housing is connected to the fluid delivery system in such a manner so that the at least one gas-filled bladder accommodates changes in fluid volume within the fluid delivery system.

4. An absorber as recited in claim 1, wherein the housing is connected to the fluid delivery system in such a manner so that the at least one gas-filled bladder accommodates changes in fluid volume within a reverse osmosis filtration system to provide a storage volume of fluid.

5. An absorber as recited in claim 1, wherein the at least one gas-filled bladder has a generally spherical configuration.

6. An absorber as recited in claim 5, wherein the housing has a generally spherical configuration with an inner diameter that is greater than an outer diameter of the at least one gas-filled bladder.

7. An absorber as recited in claim 1, wherein the connector extending from the housing is a threaded fitting.

8. An absorber as recited in claim 1, wherein the at least one gas-filled bladder has a predetermined pre-charge pressure of between about 5 psi to about 40 psi.

9. An absorber as recited in claim 1, wherein the at least one gas-filled bladder is pre-charged with air or nitrogen.

10. An absorber as recited in claim 1, wherein adjacent shell layers are formed from dissimilar materials.

11. An absorber as recited in claim 1, wherein the multi-layered polymeric shell includes successive polymeric layers formed from the group consisting of ethylene vinyl alcohol (EVOH), polyester, polyether, polyurethane, polyether urethane, polyester urethane, ethylenevinylacetate/polyethylene copolymer, polyester elastomer (Hytrel), ethylenevinylacetate/polypropylene copolymer; polyethylene, polypropylene, neoprene, natural rubber, dacron/polyester, polyvinylchloride, thermoplastic rubbers, nitrile rubber, butyl rubber, sulfide rubber, polyvinyl acetate, methyl rubber, buna N, buna S, polystyrene ethylene propylene, polybutadiene, polypropylene and silicone rubber.

12. An absorber as recited in claim 1, wherein the multi-layered polymeric shell includes as many as seventy-two successive polymeric layer.

13. An absorber as recited in claim 1, wherein the outer most polymeric layer in the multi-layered polymeric shell is a formed from a material other than ethylene vinyl alcohol EVOH due to its hygroscopic properties.

14. An absorber as recited in claim 1, wherein the at least one gas-filled bladder has an overall shell thickness of about approximately 0.035" after forming.

15. An absorber as recited in claim 1, wherein the multi-layered material from which the shell is formed has an initial thickness of about between 0.065" and 0.075" thick sheet.

16. An absorber as recited in claim 1, wherein a plurality of gas-filled bladders are disposed within the housing to provide redundancy for continuing operation in the event that one or more of the plural bladders fails.

17. An absorber as recited in claim 16, wherein the plural gas-filled bladders have similar constructions.

18. An absorber as recited in claim 16, wherein the plural gas-filled bladders have differing constructions.

19. An absorber for use in a fluid delivery system, comprising:
   a) a generally spherical housing defining an interior chamber;
   b) a threaded fitting extending radially outward from the housing in fluid communication with the interior chamber for connecting the housing to the fluid delivery system; and
   c) a generally spherical air-filled bladder disposed within the interior chamber of the housing to accommodate changes in water pressure and volume in the fluid delivery system, the bladder having a predetermined pre-charge pressure of about between 20 to 30 psi and a multi-layered flexible polymeric shell including a plurality of successive polymeric shell layers, wherein adjacent polymeric shell layers are formed from dissimilar polymeric materials to inhibit the formation of leak paths through the shell in the event that a single shell layer fails, wherein the generally spherical bladder has an outer diameter that is less than an inner diameter of the generally spherical housing.

20. An absorber as recited in claim 19, wherein the multi-layered polymeric shell includes successive polymeric layers formed from the group consisting of ethylene vinyl alcohol (EVOH), polyester, polyether, polyurethane, polyether urethane, polyester urethane, ethylenevinylacetate/polyethylene copolymer, polyester elastomer (Hytrel), ethylenevinylacetate/polypropylene copolymer; polyethylene, polypropylene, neoprene, natural rubber, dacron/polyester, polyvinylchloride, thermoplastic rubbers, nitrile rubber, butyl rubber, sulfide rubber, polyvinyl acetate, methyl rubber, buna N, buna S, polystyrene, ethylene propylene, polybutadiene, polypropylene and silicone rubber.

21. A pressure absorber as recited in claim 19, wherein the multi-layered polymeric shell includes as many as seventy-two successive polymeric layer.

22. A pressure absorber as recited in claim 19, wherein the outer most polymeric layer in the multi-layered polymeric shell is a formed from a material other than ethylene vinyl alcohol (EVOH) due to its hygroscopic properties.

23. A pressure absorber as recited in claim 19, wherein the bladder has an overall shell thickness of about approximately 0.035" after forming.

24. A pressure absorber as recited in claim 19, wherein the multi-layered material from which the shell is formed has an initial thickness of about between 0.065" and 0.075" thick sheet.

\* \* \* \* \*